March 12, 1968  R. R. JUNG ET AL  3,372,769
MATERIAL HANDLING VEHICLE

Filed April 29, 1966  3 Sheets-Sheet 3

INVENTORS
RICHARD R. JUNG
ROBERT R. RABBITT
JOHNNY T. WATTERS
BY *Robert H Johnson*
ATTORNEY 3,372,769
MATERIAL HANDLING VEHICLE
Richard R. Jung, Robert R. Rabbitt, and Johnny T. Watters, Battle Creek, Mich., assignors to Clark Equipment Company, a corporation of Michigan
Filed Apr. 29, 1966, Ser. No. 546,395
3 Claims. (Cl. 180—119)

ABSTRACT OF THE DISCLOSURE

A material handling machine having at least one fluid inflatable load supporting and friction reducing pad connected thereto, a first retractable wheel and a pair of retractable wheels. Toggle linkage is connected to the first wheel and is operable to extend the first wheel. Other toggle linkage is connected to the pair of wheels and is operable to extend the pair of wheels. A lost motion connection is provided between the linkages so that extension of the first wheel also causes extension of the pair of wheels, but the pair of wheels can be extended without extending the first wheel. A fluid actuator is connected to the source of pressurized fluid for the pad and also connected to the linkage for the pair of wheels so that whenever the pad is inflated the actuator is energized to cause the pair of wheels to extend.

---

In such vehicles it is desirable to be able to move the vehicle without inflating the pads if the vehicle is not supporting a load. Therefore, an object of our invention is to provide an inflatable fluid pad material handling vehicle with a plurality of wheels which may be extended to support the vehicle when the pad is not inflated and the vehicle is not carrying a load.

Material handling vehicles which utilize an inflatable fluid pad for supporting the load and reducing friction tend to be somewhat unstable. Therefore, a further object of our invention is to provide an inflatable fluid pad material handling vehicle with a pair of extendible stabilizing wheels.

Another object of our invention is to provide an inflatable fluid pad material handling vehicle with wheels for supporting the vehicle when the pad is not inflated and for automatically extending a pair of stabilizer wheels when the pad is inflated.

In carrying out our invention in a preferred embodiment thereof, we provide a material handling vehicle having a body with a load engaging portion and a control housing portion. A pair of fluid inflatable supporting and friction reducing pads are connected to the body and disposed beneath the load engaging portion. At least one wheel is connected to the body and disposed beneath the load engaging portion and a pair of rear wheels is connected to the body and disposed beneath the control housing portion. A first linkage connected to the front wheel actuates the front wheel to extend or retract. Similarly a second linkage connected to the rear pair of wheels acuates the rear wheeels to extend or retract. An innerconnecting member is connected to the second linkage and is engagable by the first linkage so that actuation of the first linkage to extend the front wheel also extends the pair of rear wheels. A fluid actuator is connected to the second linkage and is connected to a source of pressurized fluid which is also connected to the inflatable pads so that supplying pressurized fluid to the pads also supplies it to the actuator which serves to extend the pair of rear wheels.

Figure 1:
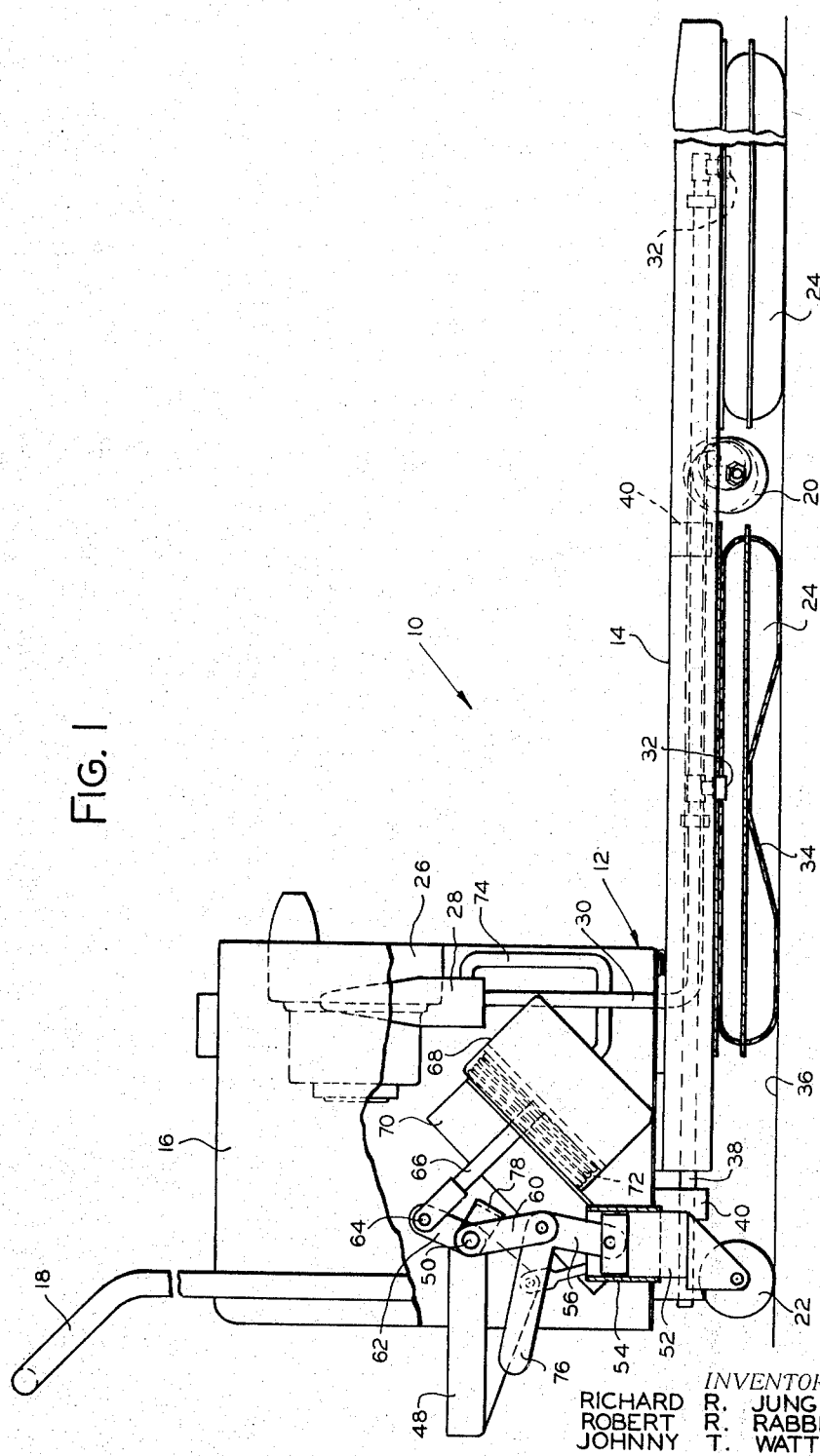
Figure 2:
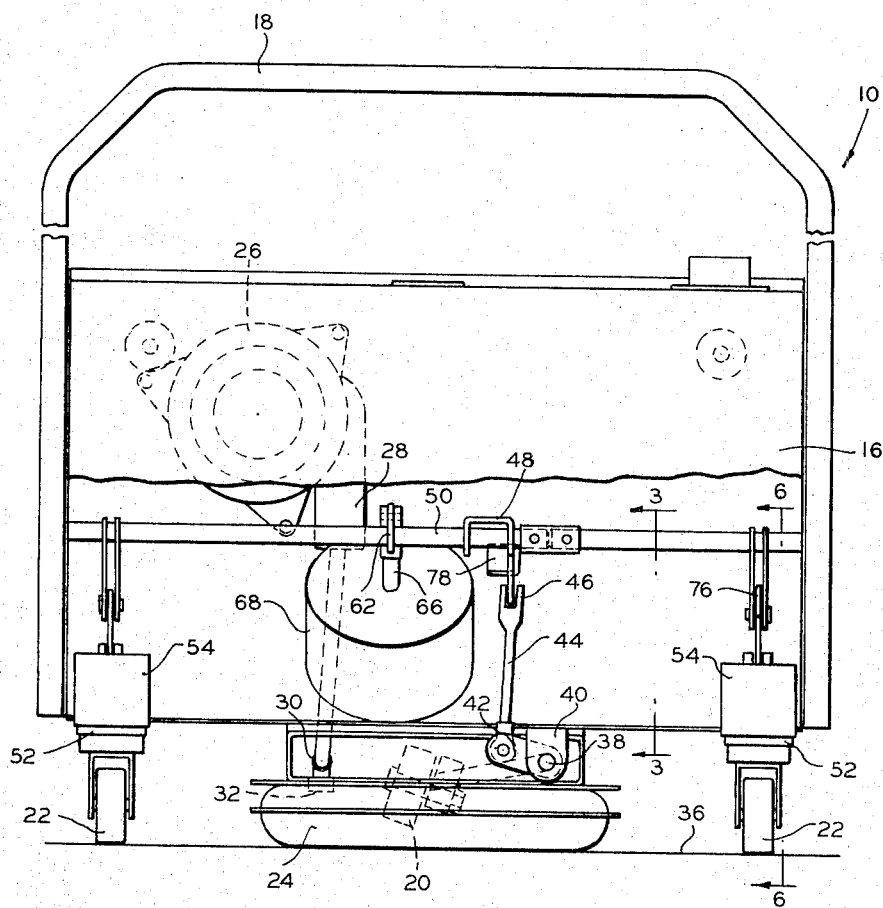
Figure 3:
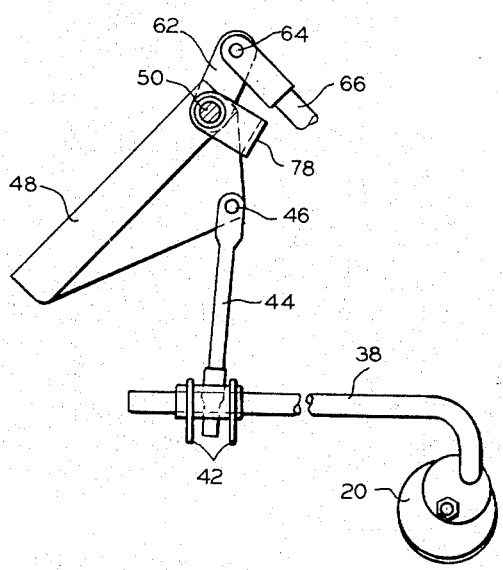
Figure 4:
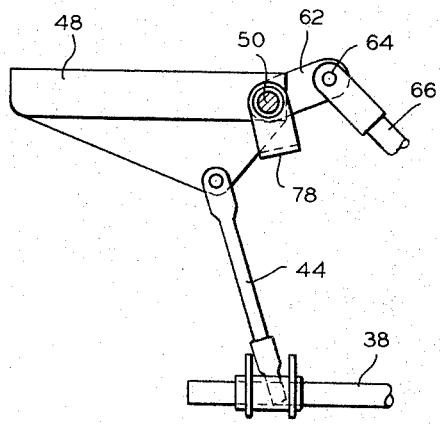
Figure 5:
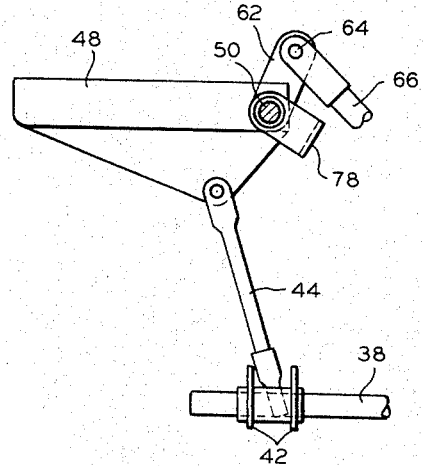
Figure 6:
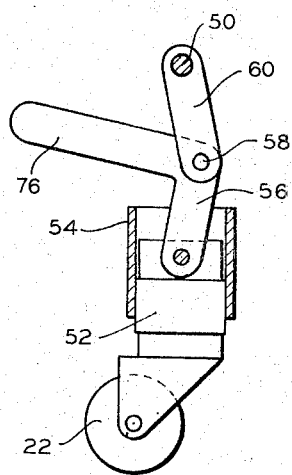

The above and other objects, features and advantages of our invention will be more readily understood when the following detailed description is taken in conjunction with the accompanying drawing wherein:

FIGURE 1 is a side elevation of a material handling vehicle embodying our invention, FIGURE 2 is a rear elevation of the vehicle shown in FIG. 1, FIGURE 3 is a fragmentary enlarged view taken along line 3—3 of FIG. 2 showing to advantage a portion of the linkage for extending and retracting the vehicle wheels, FIGURE 4 is similar to FIG. 3 with the linkage in another position, FIGURE 5 is similar to FIG. 3 with the linkage in yet another position, and FIGURE 6 is a view taken along line 6—6 of a portion of the linkage for extending and retracting the rear stabilizer wheels.

Referring now to FIGS. 1 and 2, the reference numeral 10 denotes generally a platform-type material handling vehicle or truck 10 which has a body 12 with a load engaging portion or platform 14 and a control housing portion 16.

A generally inverted U-shaped handle 18 is fixed to control housing portion 16 while a front support wheel 20 and a pair of rear stabilizing wheels 22 are connected to body 12. Front wheel 20 is disposed beneath load engaging portion 14 and the pair of stabilizing wheels 22 are connected to body 12 and located beneath control housing portion 16. Connected to and disposed beneath load engaging portion 14 is a pair of fluid inflatable load supporting and friction reducing pads 24. While pads 24 are referred to as fluid inflatable, it will be understood that it is normally desirable to inflate such pads with air, although other fluids could be used.

Vehicle 10 includes an electric motor driven air blower assembly 26 which is located in portion 16 and includes an exhaust manifold 28. It will be understood that the motor of blower assembly 26 may be connected to a battery or to an external power supply or blower assembly 26 may be replaced entirely by a connection for supplying pressurized air to vehicle 10 directly.

Blower assembly 26, when operating, supplies air to pads 24 by way of a conduit 30. While a single conduit is shown communicating with both pads 24, it will be understood that separate conduits could lead to each pad 24 from exhaust manifold 28.

Each pad 24 is supplied with air through opening 32 which communicates with the interior of the pad. Inflation of pads 24 causes them to elevate load engaging portion 14 somewhat. In the present case we have designed the air pads to elevate load engaging portion 14 about three-quarters of an inch, but the amount of elevation can be varied by changing the design of the pads. Each pad 24 includes a plurality of openings 34 located centrally of the undersurface thereof so that air which is supplied to each pad 24 causes the pad to inflate and then exhausts through openings 34 from which it moves radially outwardly between the pad and supporting surface 36. The air which flows radially outwardly from under pads 24 forms a bearing film which is 0.003 to 0.015 of an inch thick on smooth sealed surfaces and serves to greatly reduce friction between pads 24 and supporting surface 36.

Returning now to the wheels and referring also to FIGS. 3–6, front supporting wheel 20 is attached to a torsion rod 38 which extends longitudinally of vehicle 10 and is supported in a pair of journals 40 for rotation. Connected to torsion rod 38 is a lever arm 42 which is pivotally connected to a link 44. Link 44 in turn is pivotally connected at 46 to a foot lever 48 which is mounted for rotation on a cross shaft 50. Link 44 and foot pedal 48 form an overcenter toggle so that when foot pedal 48 is depressed to the position shown in FIG. 3 wheel 20 is locked in position and contacts supporting surface 36.

Each rear stabilizer wheel 22 is connected to a cylindrical member 52 which is partially telescoped and slidable within a sleeve 54 fixed to body 12. Pivotally connected to the upper end of each cylindrical member 52 is a link 56 which is pivotally connected at 58 to another link 60 that is fixed to cross shaft 50. Links 56 and 60 form an overcenter toggle which serves to lock stabilizer wheels 22 in their extended positions, as shown in FIGS. 1, 2 and 6. Also fixed to cross shaft 50 is a lever arm 62 which is pivotally connected at 64 to the actuating rod 66 of a diaphragm-type fluid actuator 68 which is mounted on a bracket 70 in control housing portion 16 and is connected to exhaust manifold 28 by a conduit 74. Actuator 68 includes a compression spring 72 which tends to bias actuating rod 66 inwardly.

The overcenter toggle 56, 60 associated with the right stabilizing wheel, as viewed in FIG. 2, includes a foot lever 76 which is integral with link 56. By pushing down on lever 76 when overcenter toggle 56, 60 is in the position shown in FIG. 6 the overcenter toggle may be brought back past its overcenter position so that spring 72 of actuator 68 will then serve to retract stabilizer wheels 22.

Also fixed to cross shaft 50 is an L-shaped member 78 which is engageable by one edge of foot pedal 48. Member 78 is disposed so that when foot pedal 48 is depressed member 78 is engaged by it and as a result support wheel 20 and rear stabilizer wheels 22 are extended into contact with supporting surface 36. It will be understood that if foot pedal 48 is depressed far enough toggles 44, 48 and 56, 60 will be moved past their overcenter positions so that wheels 20 and 22 will be locked in their extended positions.

In order to enable persons skilled in the art to better understand our invention, we will now explain the operation of it. It will be assumed that vehicle 10 is at rest and that blower assembly 26 is not supplying pressurized air to pads 24 or actuator 68. Further, it will be assumed that it is desired to move vehicle 10 to a location to pick up a load and then transport the load. Finally, it will be assumed that initially wheels 20 and 22 are in their retracted positions. Initially, the operator will depress foot pedal 48 which engages member 78 and causes toggles 44, 48 and 56, 60 to extend wheels 20 and 22 into engagement with supporting surface 36. With toggles 44, 48 and 56, 60 actuated past their overcenter positions, wheels 20 and 22 will be locked in their extended position. The associated linkage, at this point, has been actuated from the condition shown in FIG. 4 to the condition shown in FIG. 3. Vehicle 10 may now be pushed on wheels 20 and 22 to the load which is to be transported by vehicle 10. With wheels 20 and 22 extended pads 24, which at this time are not inflated, either clear the supporting surface 36 or engage it only lightly. The load to be transported is resting on an inverted U-shaped pallet or similar structure so that it will be possible to insert load engaging portion 14 of the vehicle 10 beneath the load to be transported. However, with wheels 20 and 22 extended there is not sufficient clearance beneath the load to insert load engaging portion 14. Consequently, the operator must now depress foot lever 76 which brings toggles 44, 48 and 56, 60 back past their overcenter position, spring 72 then bringing the mechanism to the position shown in FIG. 4. At this point wheels 20 and 22 are fully retracted, thereby lowering load engaging portion 14 so that there is sufficient clearance to slide it beneath the pallet and load. At this point of operation wheels 20 and 22 will still be supporting vehicle 10, but pads 24 will be dragging on supporting surface 36. However this dragging is not objectionable since it is only necessary to push load engaging portion 14 beneath the load to be transported. When load engaging portion 14 is positioned beneath the load the operator then energizes blower assembly 26 to supply pressurized air to pads 24 and actuator 68. Pads 24 inflate and elevate load engaging portion 14 so that the pallet and the load thereon is lifted clear of supporting surface 36. Also, air will then flow radially outwardly from under pads 24 to greatly reduce the friction between pads 24 and 30 and supporting surface 36 so that relatively little effort is required to move vehicle 10 together with the load across supporting surface 36. At the same time that pads 24 are inflating actuator 68 is energized so that rod 66 moves outwardly thereof, causing cross shaft 50 to rotate counterclockwise, as viewed in FIG. 1, to move to the position shown in FIGS. 1 and 5. In this condition stabilizer wheels 22 will be extended into engagement with supporting surface 36, whereby the vehicle 10 and the load carried thereon is stabilized against pivotal movement about an axis running longitudinally of vehicle 10. While wheels 22 serve as a means of stabilizing vehicle 10 when it is carrying a load, they also serve to provide pivot points about which the vehicle may be turned while a load is being transported. The vehicle is now in the condition shown in FIG. 1.

When the load being transported by vehicle 10 is brought to the desired new location blower assembly 26 is de-energized so that pads 24 start to deflate. At the same time the operator again depresses foot lever 76 to bring toggle 56, 60 past the overcenter position so that wheels 22 may be retracted through the action of spring 72.

While only a single preferred embodiment of our invention has been described in the above-detailed description, it will be understood that this description is illustrative only, and that various modifications and changes to our invention which do not depart from the scope and spirit of it will be apparent to persons skilled in the art. Therefore, the limits of our invention should be determined from the following appended claims.

We claim:

1. For use with a vehicle having an elongated body with a load engaging portion and a control housing portion, the combination comprising a fluid inflatable load supporting and friction reducing pad disposed beneath and connected to the load engaging portion, first wheel means connected to the body and disposed beneath the load engaging portion, said wheel means being actuatable between an extended position for supporting the vehicle in an elevated position when said pad is deflated and a retracted position for permitting the load engaging portion to be inserted beneath a load when said pad is deflated, and operator controlled means connected to said wheel means and the body for extending and retracting said wheel means, a second wheel means connected to the body and disposed beneath the control housing portion, said second wheel means being actuatable between an extended position for supporting the vehicle in an elevated position when said pad is deflated and stabilizing the vehicle when said pad is inflated and a retracted position for permitting the load engaging portion to be inserted beneath a load when said pad is deflated and first means connected to said second wheel means and the body for extending and retracting said second wheel means, a second means which is connected to one of said operator controlled means and said first means and cooperates with the other of said operator controlled means and said first means for actuating said wheel means to extend simultaneously, a third means connected to said first means and the body and operable to cause only said second wheel means to extend.

2. The combination as set forth in claim 1 and including a fluid actuator connected to said third means and the body, said fluid actuator being operable when supplied with pressurized fluid to cause said second wheel means to extend, and means for supplying pressurized fluid to said pad and fluid actuator simultaneously.

3. The combination as set forth in claim 2 wherein said second wheel means includes a pair of transversely spaced apart wheels connected together for conjoint movement.

References Cited
UNITED STATES PATENTS

| | | | |
|---|---|---|---|
| 1,116,086 | 11/1914 | Lewis | 280—43.13 |
| 2,568,822 | 9/1951 | Pervis | 280—43.13 |
| 3,173,510 | 3/1965 | Smith | 180—7 |
| 3,202,232 | 8/1965 | Rogers | 180—7 |
| 3,287,024 | 11/1966 | Unlinski | 280—43.12 |
| 3,183,016 | 5/1965 | Gustafsson | 280—6.1 |
| 3,276,528 | 10/1966 | Tucknott et al. | 180—7 |

BENJAMIN HERSH, *Primary Examiner.*

C. C. PARSONS, *Assistant Examiner.*